INVENTORS
A. A. STEINMETZ
H. C. ISAACS
BY
ATTORNEY

| FIG. 3 | FIG. 4 | FIG. 5 |

INVENTORS
A. A. STEINMETZ
H. C. ISAACS

BY

ATTORNEY

INVENTORS
A. A. STEINMETZ
H. C. ISAACS

ATTORNEY

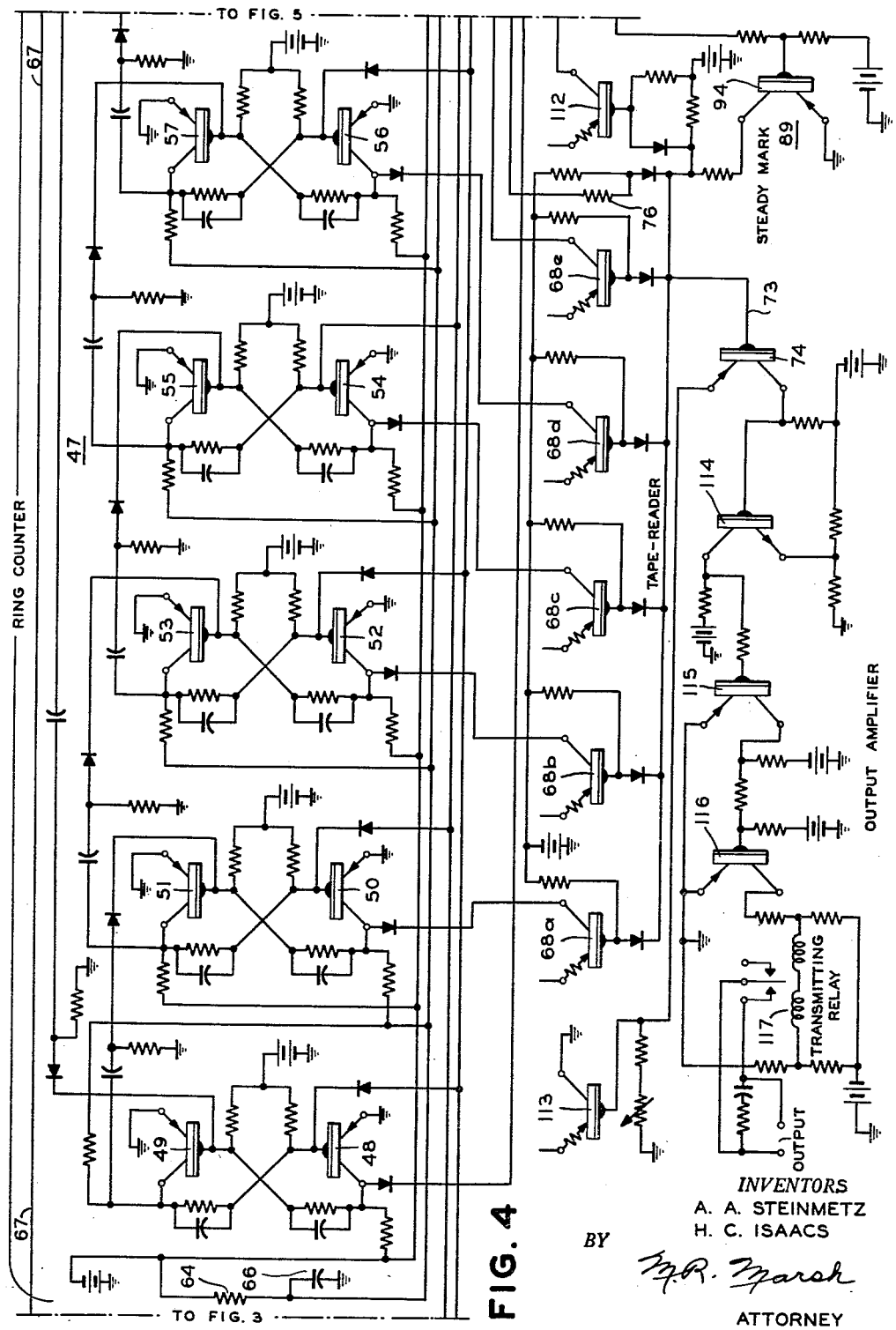

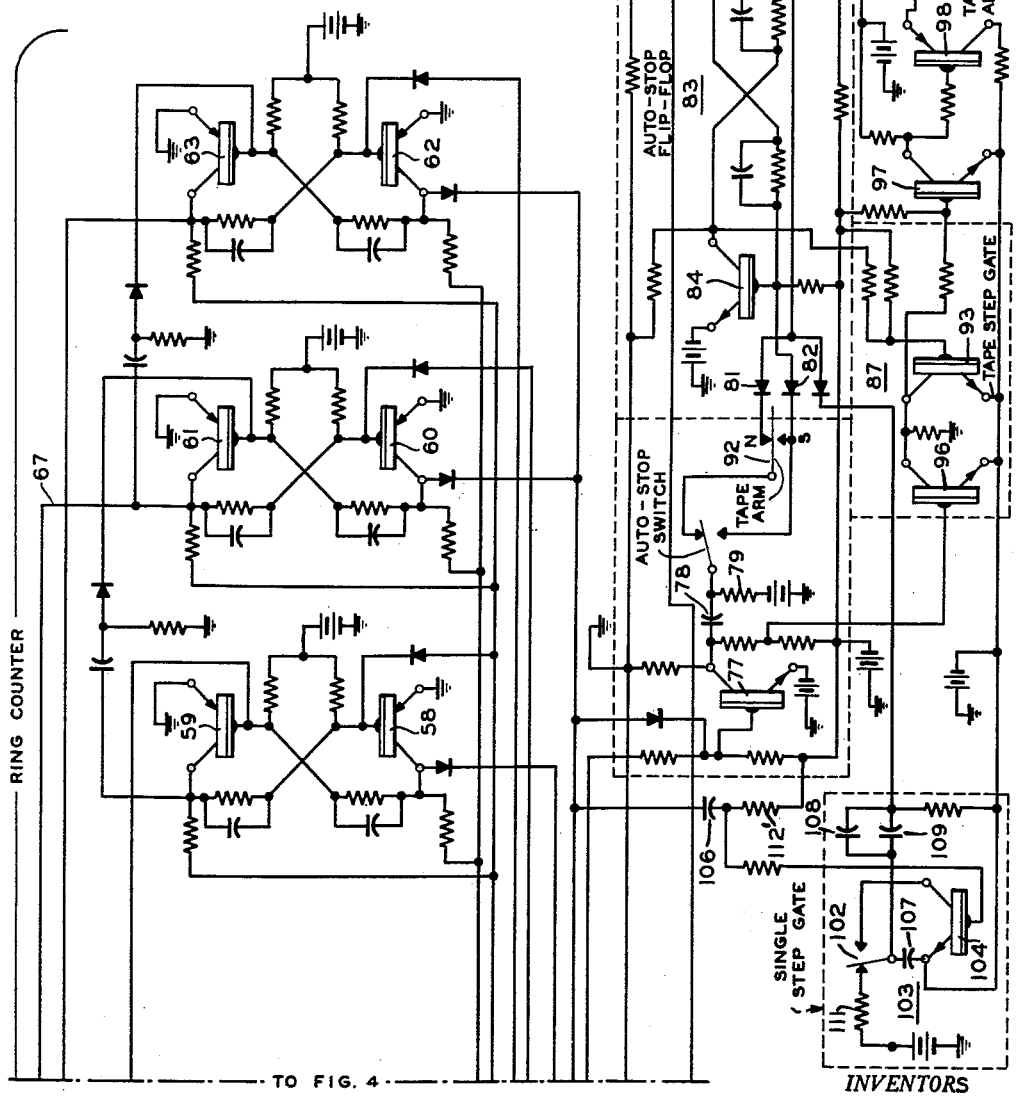

3,012,096
TELEGRAPH TAPE TRANSMITTER DISTRIBUTOR
Alfred A. Steinmetz, Yonkers, and Howard C. Isaacs, Jackson Heights, N.Y., assignors to The Western Union Telegraph Company, New York, N.Y., a corporation of New York
Filed Jan. 13, 1956, Ser. No. 558,914
11 Claims. (Cl. 178—17)

This invention relates primarily to telegraph tape transmitter-distributors and more particularly to devices of the above nature of improved and novel design for sensing and transmitting signals stored in a perforated telegraph storage tape.

Telegraph storage tapes employed at the present time normally have each transverse section thereof perforated to represent, in accordance with a predetermined plan, a character or printer function and generally there are five code positions in each transverse section of the tape. When the stored signals are transmitted, the storage tape is fed through a transmitter and sensed one transverse section at a time and normally the tape is intermittently advanced to bring each succeeding transverse section into registration with the sensing equipment.

The present invention is directed to a tape transmitter of the above general type and one of the objects thereof is to provide such a transmitter wherein the sensing of the perforations is accomplished by a light source and photoelectric means such as photo-transistors or photo-diodes.

Another object of the invention is to provide a tape transmitter wherein the only mechanical moving parts or elements are those cooperating with and effective to advance the tape with respect to the transmitter.

Still another object of the present invention is to incorporate within the transmitter an electronic distributor for distributing pulses of each code group in sequence to a transmitting circuit.

Still another object of the present invention is to provide a transmitter-distributor of the above type wherein all functions with the exception of the tape stepping are performed electronically by transistor circuitry.

In connection with the above a still further object of the invention is to provide a distributor wherein each code group of impulses is preceded by a uniform start pulse and terminated by a uniform rest pulse. A feature of the distributor resides in the provision of means whereby the start and code pulses are of equal length whereas the rest pulse is of a longer length than any one of the other pulses of a code group. Another object of the invention is to provide for single character stepping and transmitting.

The above and further objects and features of the invention will be more apparent in the following detailed description wherein reference is made to the accompanying drawings in which:

FIGS. 3, 4 and 5 are detailed circuit diagrams of the distributor-transmitter of the present invention;

Figure 7:
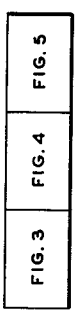
Figure 3:
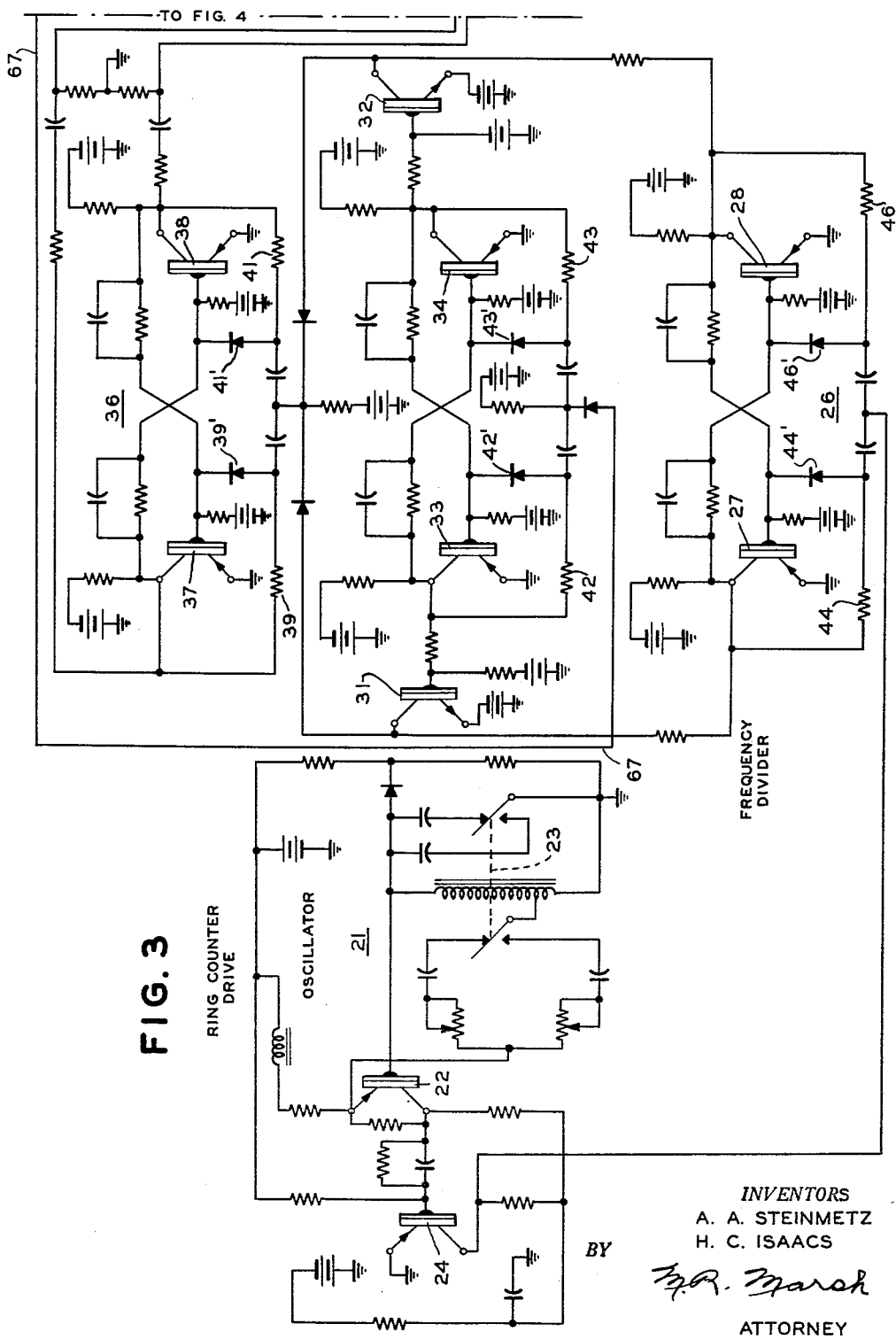

FIG. 7 indicates the manner in which FIGS. 3, 4 and 5 may be arranged to form a complete circuit.

The operation of the transmitter-distributor of the present invention is timed or controlled by an electronic oscillator of the desired stability and in the preferred embodiment the oscillator is so controlled by means of a manually operable switch to give either one or the other of two discrete frequencies and thereby cause the transmitter to operate at either one or the other of two different speeds, for example, 100 words or 250 words per minute. The output of the oscillator is fed to a frequency divider which halves the oscillator frequency and produces two outputs 180° out of phase. These outputs are connected to a pair of separate gates that are controlled in such a manner that when one gate is open the other gate is closed. A phase advance switch controls the condition of the gates which are connected to a ring counter drive which provides two outputs, each output being one-half of the input frequency thereto and 180° out of phase. The outputs of the ring counter drive are connected to a ring counter distributor composed of a number of bistable transistor operated trigger circuits of the flip-flop type. The ring counter distributor in the embodiment disclosed herein is composed of eight stages and to obtain automatic starting of the ring counter distributor, a delay circuit is incorporated therein. The delay circuit functions to delay the application of the collector voltages to certain of the transistors which is necessary for the proper initiation thereof.

One of the outputs of the ring counter drive is connected to the odd-numbered stages and the other output is connected to the even-numbered stages of the ring counter. The above arrangement is feasible since the counter comprises an even number of stages and has the advantage of stabilizing the counter operation since at the time a stage is being turned on there is no pulse tending to turn it off.

Figure 1:
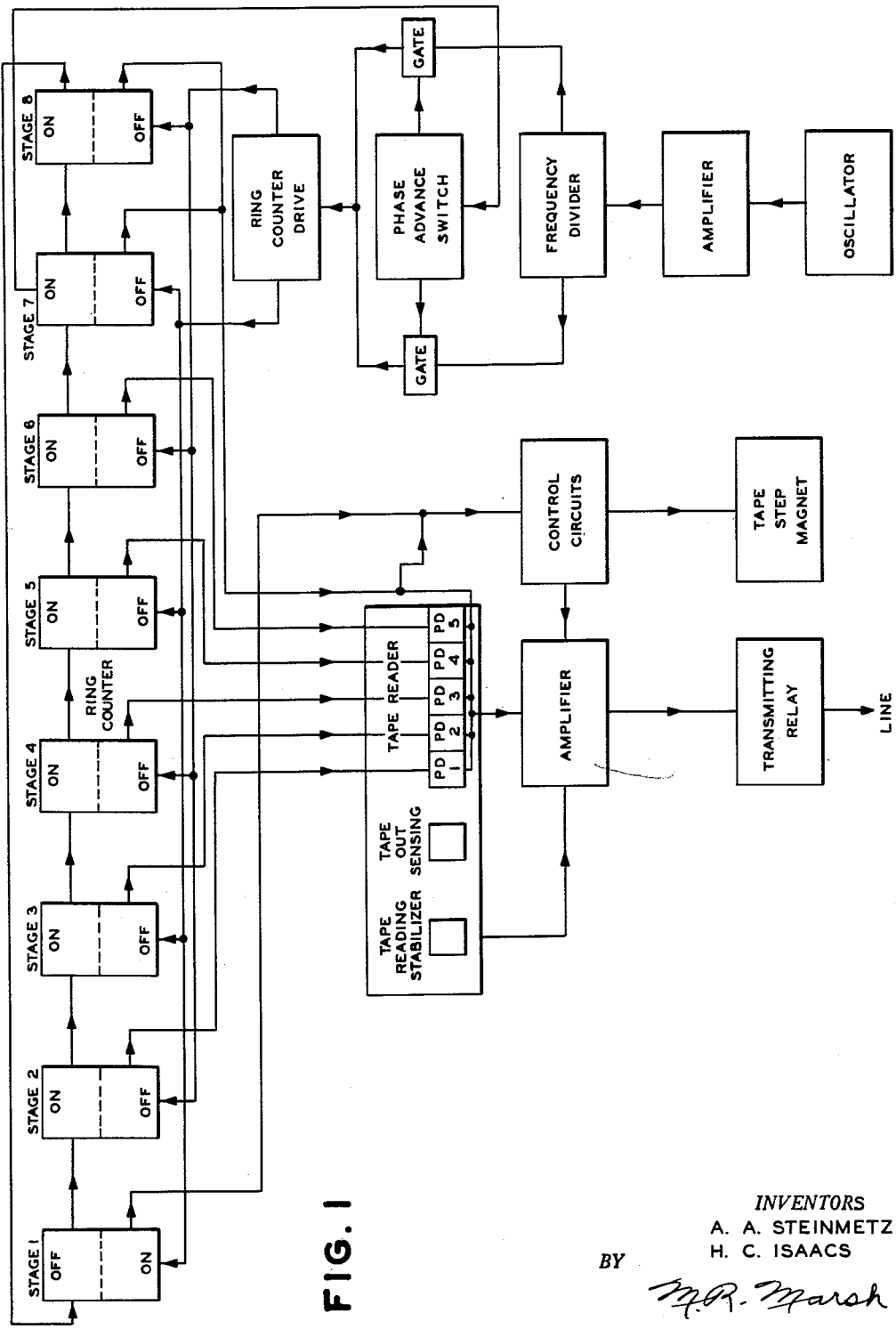
FIG. 1 is a block diagram of various elements and parts of the invention.

If, as shown in FIG. 1, the counter is set so that only one stage is on, such a stage being considered to be on when the lower one or its odd-numbered transistor is on, the pulses from the ring counter drive will cause succeeding stages of the counter to be turned on or activated in sequential order. When the seventh stage is pulsed off, a pulse is generated that is effective to trigger the input of the phase advance switch so that the condition of the phase advance switch gates reverses. This causes the last or eighth stage to remain in an on condition only half as long as the preceding seven stages and thus yields a 7½ unit code. In other words, the start and five intelligence pulses of the code are of equal length whereas the rest pulse is one and a half times as long as any of the other pulses.

The start pulse of each code group is generated by the No. 1 stage of the ring counter and the next five stages 2 to 6 are individually connected to respective photo-diodes or photo-transistors. When a photo-diode is illuminated by light shining through a hole in the tape, a marking code pulse is transmitted when its respective stage of the ring counter is on. The start pulse is invariably a spacing impulse, and the rest pulse is invariably a marking impulse and is transmitted when stages 7 and 8 of the ring counters are on.

The marking code pulses and the rest pulse are amplified and operate a transmitting relay. The rest and start pulses also are directed to control circuits to time the autostop, tape feed, and single character step functions.

Figure 2:
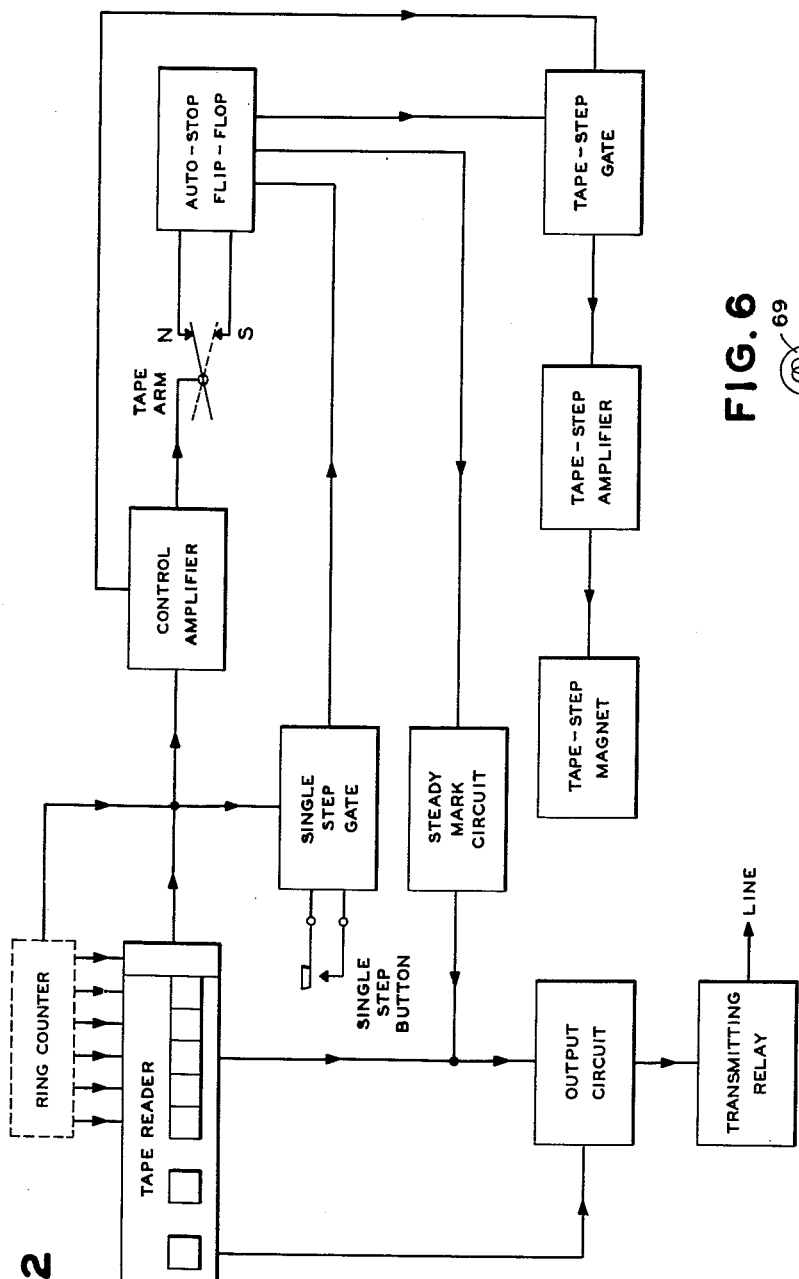
FIG. 2 is a block diagram of a part of the circuits of the present invention relating primarily to the autostop and single character stepping feature.

Referring now to FIG. 2, some of the control circuits will be outlined and during normal operation the tape arm is in the normal or N position. The tape arm rides the tape between the tape perforator and the tape reader as in the conventional arrangement, and when there is a supply of tape ahead of the tape reader, the tape arm engages its normal or N contact. When the tape between the perforator and the tape reader becomes taut, the tape arm is actuated to contact its stop or S contact. At such time the tape step gate is open and the rest and start pulses derived from the ring counter are amplified and pass through the tape step gate and the tape step amplifier to the tape step magnet. With the tape arm in the N position the autostop flip-flop is in the transmit position which holds the tape step gate open and the steady mark circuit is disabled. Upon moving the tape arm to the stop or S position, the output of the control amplifier is directed to the other half of the autostop flip-flop and following rest pulses reverse the condition of the autostop flip-flop. This action closes the tape step gate and prevents further tape stepping. In addition the steady mark circuit is activated to supply a steady marking condition to the output amplifier.

With the tape arm in its stopped or S position, the tape may be stepped one character and the character transmitted to line by operation of the single step button. Such operation causes a pulse to be transmitted from the single step gate to the autostop flip-flop at the beginning of the rest pulse. Transistor 104 is coupled to the rest stage through the RC circuit of capacitor 106 and resistor 112 such that the rest pulse is differentiated yielding a sharp pulse coinciding with the beginning of the rest pulse that is supplied to the base of transistor 104. Transistor 104 is turned on for the duration of this sharp pulse causing capacitors 108 and 109 to discharge negatively to the base of transistor 86, this reverses the autostop flip-flop which causes it to assume its transmit position, disables the steady mark circuit and opens the tape step gate. The tape is thus stepped and the next character moved over the sensing means of the transmitter. The following rest pulse turns the autostop flip-flop back to its autostop position and the tape step gate is closed and a steady mark is again transmitted to the output amplifier. Another operation of the single step button causes the above operations to be repeated and the next succeeding character in the tape to be transmitted. With this arrangement a single step switch 102 can be operated at any time such as during the transmission of a character code without mutilating that code.

With the tape arm in its S or stopped position the movement thereof to its N or normal position permits the next rest pulse to operate the autostop flip-flop into its transmit position. This opens the tape step gate and disables the steady mark circuit so that pulses representing the characters are transmitted to the output amplifier. The autostop switch enables the transmitter to be manually stopped at any time such as in the middle of a message even though there is a supply of tape ahead of the tape reader. With the autostop switch in its upper position the associated circuits are such that the tape arm normally controls the starting and stopping of the tape reader whereas with the autostop switch in contact with its lower stop, the circuits are such that the next rest pulse operates the autostop flip-flop back to its autostop condition and effects closure of the tape step gate.

With the above described general operation of the distributor transmitter in mind the detailed circuits and functions of the distributor transmitter will now be set forth wherein reference is made to the detailed circuits of FIGS. 3 to 5.

The controlling oscillator 21 includes a transistor 22 which is arranged to oscillate at either one or the other of two discrete frequencies. By means of the manual switch 23 either one or the other of the two oscillator tank circuits are coupled to the transistor 22 for the two frequencies of oscillation. With switch 23 in one position the frequency of the oscillator 22 may be for example 150 cycles per second which is that required for 100 words per minute operation of the transmitter distributor. With the switch 23 in its other position the transistor 22 may oscillate at the rate of 375 cycles per second which is that required for 250 words per minute operation. The output of the oscillator 22 is preferably substantially a sine wave and is fed to a transistor amplifier 24 which converts the sine wave into a series of positive pips or spikes.

The output of the amplifier 24 is fed to the common output tap of a frequency divider 26 including a pair of transistors 27 and 28. The circuits associated with the transistors 27 and 28 are such that only one transistor may be active or on at one time. If it is assumed that initially transistor 27 is conducting or active and transistor 28 is nonconducting or off, positive pulses from the amplifier 24 applied to the common input of the frequency divider will reverse the conditions of the transistors 27 and 28. The application of the positive pulse to the base of the conducting transistor, such as 27, causes it to assume an off condition. The action of this transistor in going off places a negative bias on transistor 28 through the cross-over network causing transistor 28 to assume an on condition. The next positive pulse from the amplifier 24 turns transistor 28 off and transistor 27 on. A square wave output is obtained from the collectors of each transistor 27 and 28 and is applied to respective transistor gates 31 and 32 which are under the control of so-called phase advance transistors 33 and 34 respectively. The transistors 33 and 34 determine whether gates 31 and 32 are open ore closed through the control of the bias on these gates. The control circuits of the phase advance switch transistors 33 and 34 are similar to those associated with the transistors 27 and 28 of the frequency divider 26.

It will be assumed that switch transistor 33 is on and switch transistor 34 is off and for this condition the collector of transistor 33 is essentially at ground potential making the base of gate 31 positive with respect to its emitter. Transistor 31 is of the NPN type and is biased in an on or closed condition. Thus the square wave outputs of the on transistor such as 27 of the frequency divider 26 are shorted to battery and are prevented from being passed to the ring counter drive 36. Conversely with switch transistor 34 in an off condition, the base of gate transistor 32 will be biased negatively so as it will be off or open and the output from transistor 28 of the frequency divider 26 will pass to the input ring counter drive 36.

The ring counter drive 36 includes a pair of transistors 37 and 38 arranged in the manner similar to the transistors 33 and 34, and 27 and 28 of the phase advance switch and frequency divider respectively. As will be noted the ring counter drive 36, the phase advance switch and the frequency divider 26 have in the circuits thereof resistors 39 and 41, 42 and 43, 44 and 46, so arranged to apply a negative bias to associated diodes 39', 41', 42', 43', 44' and 46' connected to the base of the respective transistor that is off thus preventing the positive trigger pulse at the base of this transistor from interfering with the coincident negative pulse from the conducting transistor.

The transistors 37 and 38 of ring counter drive 36 are pulsed alternately on and off by the pulses passed through either gate 31 or 32 and these in turn pulse the ring counter distributor 47 consisting of eight stages of bistable flip-flop trigger circuits. Each stage of the ring counter distributor 47 includes a pair of transistors such as 48—49, 50—51, 52—53, 54—55, 56—57, 58—59, 60—61, and 62—63. The odd numbered stages of the ring counter distributor are pulsed from one output of the ring counter drive, such as transistor 38, while the even numbered stages are pulsed from the other output, such as transistor 37, of the ring counter drive. This arrangement adds to the stability of the counter circuit having an even number of stages since the pulse which turns one stage off is not applied simultaneously to the following stage which is to become conducting or on.

The ring counter is started with all the even numbered transistors of the various stages thereof off with the exception of transistor 50 which is on. All odd numbered transistors of the ring counter are on except transistor 51 which is off and this initial condition is obtained by a delay circuit including resistor 64 and capacitor 66 between the collectors and negative potential of all the odd numbered transistors except transistor 51 but including the even numbered transistor 50. When power is applied all the transistors 48 to 63 of the ring counter that are connected directly to negative potential will have the bases thereof biased positively, for example, transistor 51 is biased off whereas the base of transistor 50 will be negatively biased or conditioned on, and after a delay imposed by the resistor 64 and capacitor 66 the counter is ready for operation.

Positive pulses from the ring counter drive 36 are applied to the bases of the even numbered transistors of each stage of the ring counter in the manner set forth. Assume that the counter is in its proper initial condition and that a positive pulse is being transmitted from transistor 37 to the ring counter distributor. This pulse will affect only transistor 50 of the second stage which is the only even numbered transistor in an on condition. Transistor 50 is biased positively by this pulse and will be switched off. As a result transistor 51 will be turned on. The changing of transistor 51 from an off condition to an on condition swings its collector positively and sends a pulse to the base of transistor 53. This turns transistor 53 off and transistor 52 on. Thus stage 3 of the ring counter is activated and remains in this condition until transistor 52 receives a positive pulse from the ring counter drive 36 which will occur two oscillator cycles later.

In a similar manner the ring counter 47 is stepped through the succeeding stages until stage 8 is reached. When stage 8 is turned on by the transfer pulse from stage 7 a positive pulse is also sent from stage 7 over conductor 67 to the input of the phase advance switch. This positive pulse causes the phase advance switch to reverse its condition, turning the gate on that was off, and the gate that was off on. If, for example, gate 31 was open and gate 32 closed, this positive pulse will turn gate 31 off or close the same and turn gate 32 on or open. Accordingly the next ring counter drive pulse is derived from the oscillator cycle following the one that turned stage 7 off. As a result stage 8 is turned off only one oscillator cycle after it was turned on whereas all the other stages remained for the time of two oscillator cycles. Thus stages 7 and 8 together are on an interval of time equal to one and a half times the period stages 1 to 6 were on and generate the rest pulse of the code group which is one and a half normal pulse units long or a so-called 7½ unit code is formed.

Figure 6:
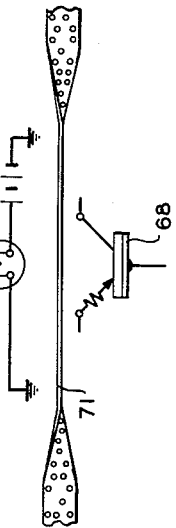
FIG. 6 is a view illustrating the tape sensing arrangement.

The tape sensing or reading unit includes a set of five photo-diodes or photo-transistors 68a, 68b, 68c, 68d and 68e each in line with a respective code hole position in the tape. A light source 69 above the tape shines through holes or perforations in the tape to activate the photo-diodes 68. The arrangement of one photo-diode 68 with respect to the tape 71 and light source 69 is shown in FIG. 6. The photo-diodes 68a to 68e are individually connected to stages 2 to 6 respectively of the ring counter and the bases of each of the photo-diodes 68 are connected by a conductor 73 to the base of a transistor amplifier 74. The output of stages 7 and 8 of the ring counter are connected together and through a resistance 76 to the conductor 73 and thence to amplifier 74. Since stages 7 and 8 when activated invariably pulse the amplifier 74, a marking pulse of one and a half units duration is sent to the amplifier for each cycle of operation of the ring counter. As will be noted, stage 1 of the ring counter is not connected to the tape reader and thus a spacing interval of one code unit in length is provided following each pulse from stages 7 and 8 of the ring counter. This spacing impulse is the start impulse of each code group.

The positive pulse from stage 1 of the ring counter and those from stages 7 and 8 are applied to the base of transistor 77 of the NPN type. These pulses switch transistor 77 on and transmit a negative pulse therefrom to a differentiating network including condenser 78, resistor 79 and diodes 81 and 82. This network converts the pulse to a sharp negative pip or spike which is applied to the autostop flip-flop 83 including transistors 84 and 86. The autostop flip-flop 83 has individual inputs to each of its transistors 84 and 86 and controls the tape step gate 87 and steady mark circuit 89. For the time being it will be assumed that after power has been turned on for the circuits, transistor 86 is on and transistor 84 is off, which will be the condition with the autostop switch and tape arm 92 in their idle positions. This condition puts ground on the collector of transistor 84 and biases the base of transistor 93 positively causing it (an NPN type) to conduct and thus the tape step gate 87 is closed. Since transistor 86 is on, negative potential is applied to the base of transistor 94 of the steady mark circuit causing it to conduct. The collector of transistor 94 is connected to the common conductor 73 of the tape reader and while transistor 94 is conducting, a steady mark condition is sent to the output amplifier transistor 74.

When the ring counter 47 starts to operate, the first rest pulse is amplified by transistor 77, differentiated and a negative pulse sent to the base of transistor 86. This reverses the condition of the autostop flip-flop 83 causing transistor 86 to be off and transistor 84 to be on. In this state the autostop flip-flop 83 is in its normal or transmit position where it will remain until the autostop switch tape arm is actuated. With the autostop flip-flop 83 in its transmit condition, the steady mark circuit to the amplifier transistor 74 is switched off by the positive bias applied to the base of transistor 94. At this time the tape step gate transistor 93 is turned off or opened by the negative bias applied to its base.

The rest pulse also appears at the base of transistor 96 in an amplified negative condition which biases transistor 96 off. With gate transistor 93 opened, the base of transistor 97 is biased positively or on. This causes a negative bias to be applied to the base of transistor 98 making it active and in turn switching transistor 99 on. The collector of transistor 99 is connected through the coils of the tape step magnet 101 to suitable potential and in conjunction with the energization thereof the tape is advanced one character space to move the next succeeding transverse section into operative relationship with the photo-diodes 68 and light source 69. The pulse operating the tape step magnet 101 is equal to the length of the rest and stop pulses.

To stop transmission of signals to the line circuit the autostop tape arm switch 92 may be operated from its normal up position to its stop or lower position. The tape arm is normally controlled by the storage tape and operates to its stop position by a taut tape condition.

As previously stated, the autostop flip-flop 83 will reverse its state because of the negative pulse received on the base of transistor 84. This pulse is generated by the leading edge of the rest pulse from stages 7 and 8 of the ring counter. Thus a character will not be mutilated when transmission is started or stopped since this stopping and starting occurs during the rest pulse. The reversal of the autostop flip-flop 83 to its stop position places a steady mark condition on the amplifier transistor 74 and closes the tape step gate 87. Closing the tape step gate prevents the rest and start pulses from reaching the tape step amplifier transistors 97, 98 and 99. Thus it is evident that if transistor 93 is conducting, that is, the gate is closed, negative potential is applied to both the emitter and collector of transistor 96 preventing transmission of the rest and start pulse to transistor 97. Reversal of the autostop flip-flop to the stop position also activates the steady mark circuit 89 including transistor 94 and sends a steady mark condition to the amplifier 74.

When the transmitter distributor is in an autostop or idle condition, single characters stored in the tape may be stepped through the transmitter and the stored character transmitted. This is accomplished by the operation of switch 102, and a character is stepped and transmitted each time the switch is operated. The switch 102 is included in the single step gate circuit 103 which also has a step gate transistor 104 and associated circuits. The transistor 104 is biased on by the leading edge of each rest pulse and capacitor 106 applies a sharp pulse to the base of transistor 104. Transistor 104, however, will not conduct until switch 102 is operated to complete the collector circuit thereof. With switch 102 operated, capacitors 107, 108 and 109 are connected to the collector of transistor 104 and normally these capacitors are charged through resistor 111 when the switch 102 is in its normal position. Now when a rest pulse is generated by the ring counter 47, differentiated by capacitor 106 and resistor 112' and applied to the base of transistor 104, it conducts and a negative pulse caused by the discharge of capacitors 108 and 109 is sent to the base of transistor 86. This reverses the condition of the autostop flip-flop from a stop to a transmit position, and as a result the tape is stepped one character, steady mark is removed from the line circuit and the next character in the tape is read by the photo-diodes 68. The following rest pulse then reverses the autostop flip-flop 83, closing the tape step gate and preventing further tape stepping operations, and in conjunction therewith a steady mark is applied to the line circuit. The tape will be stepped but once even if switch 102 is held actuated because the capacitors in the single step gate 103 will have discharged before the receipt of the next rest pulse. Capacitor 107 functions like a battery to keep capacitors 108 and 109 charged while switch 102 is depressed and transistor 104 is waiting for a rest pulse before it can conduct. During this period transistor 104 will absorb some charge to supply the off current to the transistor. Capacitor 107 is of such a value that during this interval it will retain its charge and insure that when transistor 104 does conduct, a sufficiently large pulse will be transmitted to the autostop flip-flop.

The tape reader in addition to the code sensing photo-diodes 68 includes a tape-out sensing photo-diode 112 and a stabilizing photo-diode 113. With a tape in the transmitter and over the code reading photo-diodes 68, light from the source 69 is blocked or prevented from falling on the tape-out sensing diode 112. However, on a tape-out condition light will fall upon photo-diode 112, and the common point of the tape reader will be essentially at ground potential and a steady mark condition will be sent to the amplifier transistor 74. In addition to the amplifier transistor 74 the output amplifier includes transistors 114, 115 and 116 which amplify the pulses from the tape reader. Transistor 116 drives the transmitting relay 117 by means of a polar bridge type circuit so arranged that approximately equal currents flow through the transmitting relay coils in opposite directions during marking and spacing conditions.

The stabilizing photo-diode 113 is always exposed to light from the source 69 and is in a bridge type circuit. Any change in the translucence of the tape, variations in lamp voltage of modulation of the light due to an alternating current source, is stabilized by the photo-diode 113 by changing the emitter potential on transistor 74 of the output amplifier. For example, if the light source 69 gets brighter the bias on transistor 74 is made less negative and a proportional increase in light on the photo-diode 68 is required to cause a marking signal. Conversely as the light becomes dimmer, the bias is made more negative and less light is required for a marking signal.

While the invention has been described in but a single preferred embodiment, it will be obvious that various modifications may be made therein without departing from the spirit or essential attributes thereof, and it is desired therefore that only such limitations be placed thereon as are specifically set forth in the appended claims.

What is claimed is:

1. An electronic distributor comprising an even number of on-off conditioned bistable trigger stages connected in a closed ring with only one of said stages being on at a time, each of said stages having individual control leads and output leads, said output leads having output thereon incident to the turning on of its respective stage a source of trigger pulses, electronic means for dividing said source of pulses into two separate and distinct signal groups, means for alternately applying signals from one group and then the other to control leads of said trigger stages, means within said trigger stages responsive to a trigger pulse to trigger the on stage off and the next succeeding stage on, an electrically controlled phase shifting circuit for said signal groups and means whereby the output incident to the triggering on of a predetermined one of said stages is effective to operate said phase shifting circuit to switch the phase relationship of said signal groups and the application thereof to said trigger stages.

2. An electronic distributor comprising a plurality of on-off conditioned bistable trigger stages connected in a closed ring with only one of said stages being on at a time, a source of trigger pulses, means for dividing said trigger pulses into two outputs with each of said outputs consisting of trigger pulses one-half the frequency of said source and 180° out of phase with respect to each other, means for applying the trigger pulses of one of said outputs at a time to said closed ring, means including said trigger stages and responsive to said pulses to trigger the on stage of said distributor off and the next stage on in sequential order, an electronic phase shifting circuit, an electronic feedback circuit, and means responsive to the triggering on of a predetermined one of said stages to operate said phase shifting circuit through said feedback circuit to apply the other of said outputs in turn to said ring.

3. An electronic distributor comprising a plurality of on-off conditioned bistable trigger stages connected in a closed ring with only one of said stages being on at a time, a source of trigger pulses, means for dividing said trigger pulses into two outputs with each of said outputs consisting of trigger pulses one-half the frequency of said source and 180° out of phase with respect to each other, electronic gate circuits for said outputs, means including said gate circuits for applying the trigger pulses of one of said outputs at a time to said closed ring, means whereby said trigger stages are responsive to said pulses to trigger the on stage off and the next stage on in sequence, electronic gate circuit controls, means including said gate circuit controls for placing succeeding cycles of the triggering of said ring alternately under control of said two trigger pulse outputs, and means including the shifting of the control of said ring from one of said outputs to the other to advance the succeeding cycles of operation of said ring with respect to said outputs.

4. In an electronic distributor having a plurality of bistable stages connected in a closed ring, each of said stages having an on condition and an off condition with only one of said stages being in an on condition at a time, a source of trigger pulses, means whereby said pulses when applied to said ring successively trigger the on stage of said distributor off and the next stage on, means for dividing said trigger pulses into two outputs with the pulses of one output 180° out of phase with respect to the pulses of the other output, a gate circuit in each of said outputs means whereby said gate circuits control the application of the associated output to said distributor in such a manner that only one of said outputs is applied to said distributor at a time, an electronic feedback circuit from said ring and means operative upon the triggering on of a predetermined one of said stages to activate said feedback circuit to reverse the condition of said gates whereby said outputs alternately drive said distributor for successive cycles of operation.

5. In an electronic distributor having a plurality of bistable stages connected in a closed ring, each of said stages having an on condition and an off condition with only one of said stages being in an on condition at a time, a source of trigger pulses, means whereby said pulses when applied to said ring successively trigger the on stage of said distributor off and the next stage on, means for dividing said trigger pulses into two outputs with the pulses of one output 180° out of phase with respect to the pulses of the other output, a gate circuit in each of said outputs for gating the application of the associated output to said distributor in such a manner that only one of said outputs is applied to said distributor at a time, a ring counter drive circuit, means including said ring counter drive circuit for dividing the trigger pulses passing through an open gate and applying the same to alternate stages of said distributor, a feedback circuit from said distributor to said gating circuits, and means controlled by said feedback circuit to control the gates of said outputs.

6. In an electronic distributor having a plurality of bistable stages connected in a closed ring, each of said stages having an on condition and an off condition with only one of said stages being in an on condition at a time, a source of trigger pulses, means whereby said pulses when applied to said ring successively triggering the on stage of said distributor off and the next stage on, means for dividing said trigger pulses into two outputs with the pulses of one output 180° out of phase with respect to the pulses of the other output, a gate circuit in each of said outputs for gating the application of the associated output to said distributor in such a manner that only one of said outputs is applied to said distributor at a time, a ring counter drive circuit, means including said ring counter drive circuit for dividing the trigger pulses passing through an open gate and applying the same to alternate stages of said distributor, a feedback circuit from said distributor to said gating circuits activated by the triggering on of a predetermined one of said stages, and means controlled by said feedback circuit to control said gates to alternately apply said outputs to said distributor and advance the operation thereof one half a cycle of the pulse frequency of an output each time the control of said distributor is shifted from one of said outputs to the other.

7. In combination with the distributor set forth in claim 6, a cyclically operable tape transmitter including tape sensing means and tape advancing means controlled by said distributor, said transmitter also including a dual positionable tape controlled lever, means controlled by said lever in a first position to permit respective cyclic operations of said transmitter by said distributor to sense and advance said tape and transmit representative signals, means controlled by said lever in a second position to normally stop operation of said transmitter and said distributor and maintain a steady state signal output therefrom, and a manually operable means to disable said last mentioned means and permit a predetermined number of cycles of conjoined operation of said distributor and transmitter for each operation of said manually operable means.

8. In combination with the distributor set forth in claim 6, a signal storage tape controlled transmitter having tape sensing means and tape advancing means, means controlled by said distributor to cyclically operate said tape advancing means and said sensing means to derive signal outputs from said sensing means corresponding to the stored signals sensed, a tape supply controlled element operatively controlled by the supply of tape to start and stop operation of said distributor and transmitter, an auxiliary control, and means operative by said control with said distributor and transmitter in a stopped condition under the control of said tape supply control element to initiate said distributor and transmitter into a predetermined number of cycles of operation for each operation of said auxiliary control.

9. In an electronic distributor having a plurality of bistable stages connected in a closed ring, each of said stages having an on condition and an off condition with only one of said stages being in an on condition at a time, a source of trigger pulses, electronic circuit means for dividing said trigger pulses into a plurality of groups, circuit means for applying one group of pulses at a time to said distributor means whereby said pulses when applied to said ring successively trigger the on stage of said distributor off and the next stage on an electronically controlled feedback circuit from said distributor, means including said feedback circuit for alternately and periodically controlling the successive cycles of operation of said distributor solely by one group of said pulses at a time and with said groups in turn, and means under the control of a predetermined stage of said distributor for activating said feedback circuit for shifting the control of said distributor between the groups of said pulses 10. In a telegraph tape transmitter having a tape sensing means for sensing stored signals in a tape and a cyclically operable tape advancing means, a distributor for distributing sensed code groups to a sending circuit and operating said tape advancing means, a dual positionable tape controlled lever, means whereby said lever in a first position permits operation of said tape advancing means and normally in a second position stops operation of said tape advancing means, a manually operable switch, means controlled by said switch with said lever in said second position to permit a predetermined number of cycles of operation of said advancing means and said distributor for each operation of said switch.

11. In combination, a telegraph storage tape, a tape transmitter for sensing character code groups stored in said tape, said transmitter including a tape advancing means, a distributor for controlling said transmitter to sequentially transmit to a sending circuit groups of pulses representing sensed code groups, means including said distributor for preceding each group by one line condition and following each group by a second line condition, a tape controlled means normally effective to start and stop operation of said transmitter, means whereby said second line condition is applied to said line when said transmitter is stopped, a manually operable single character step means, and means controlled by each operation of said last mentioned means with said transmitter in a stopped condition to remove said second line condition from said line and transmit thereto single character code groups stored in said tape.

References Cited in the file of this patent

UNITED STATES PATENTS

| | | |
|---|---|---|
| 2,382,261 | Parker et al. | Aug. 14, 1945 |
| 2,468,462 | Rea | Apr. 26, 1949 |
| 2,712,037 | Phelps et al. | June 28, 1955 |
| 2,756,934 | Ziffer | July 31, 1956 |
| 2,768,290 | Harris et al. | Oct. 23, 1956 |
| 2,773,983 | Baker et al. | Dec. 11, 1956 |
| 2,882,423 | MacSorley | Apr. 14, 1959 |

OTHER REFERENCES

"Megacycle Stepping Counter," by C. B. Leslie, Proceedings of the Institute of Radio Engineers, vol. 36, No. 8, August 1948 (copy in 250/27CC).